July 11, 1933.  W. F. GERHARDT  1,917,965
HELICOPTER CONTROL AND STABILIZER
Filed Sept. 4, 1930   2 Sheets-Sheet 1
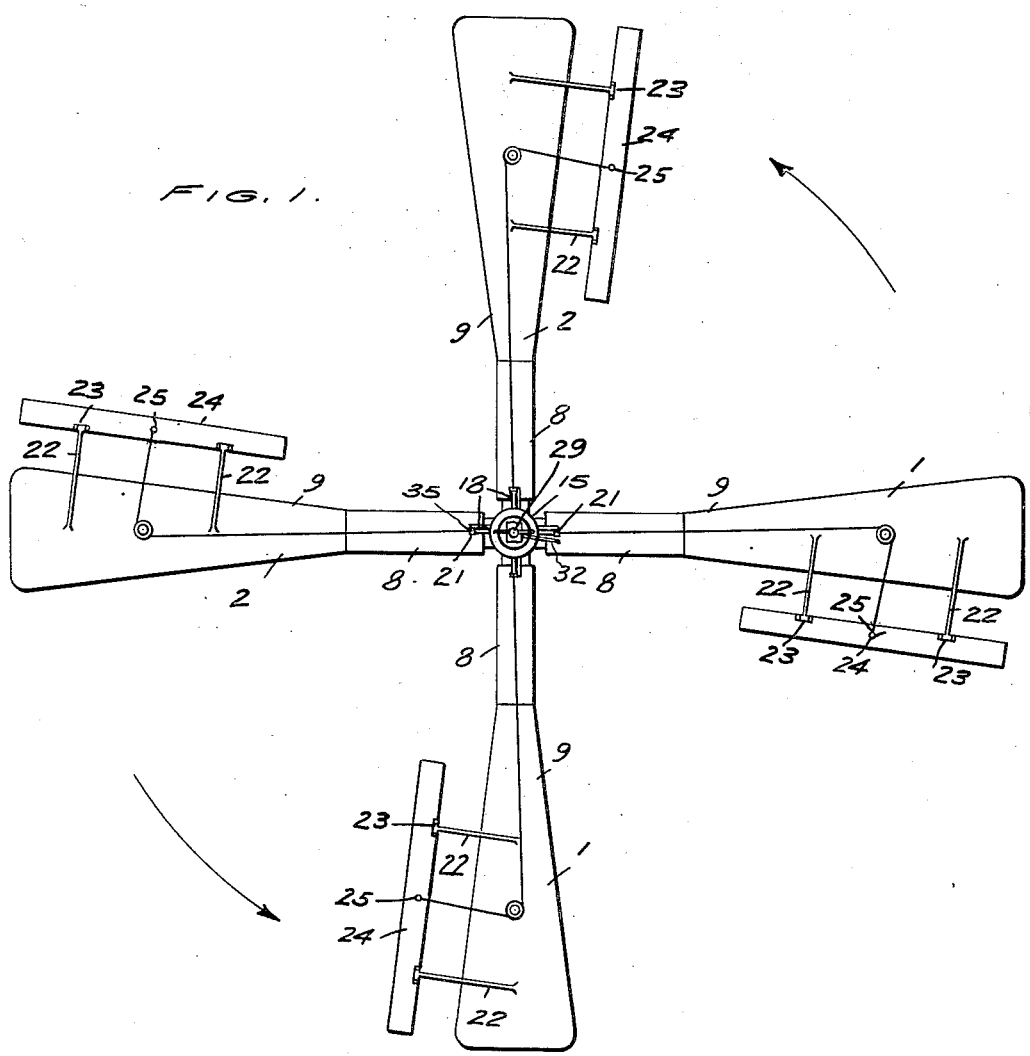
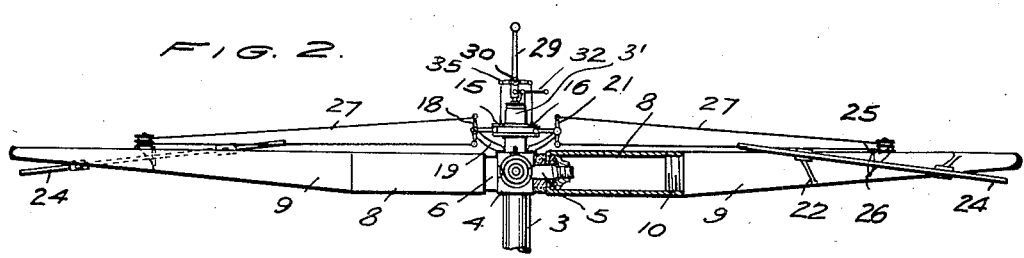
INVENTOR
WILLIAM F. GERHARDT
BY Robert H. Young
ATTORNEY

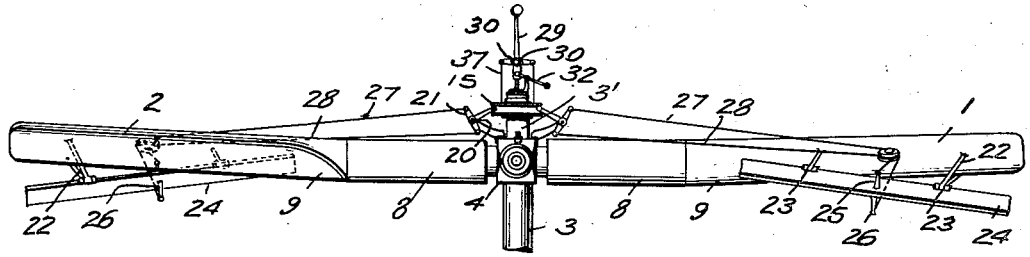
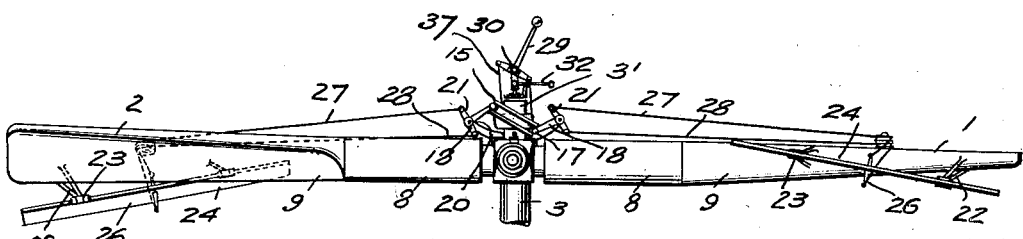
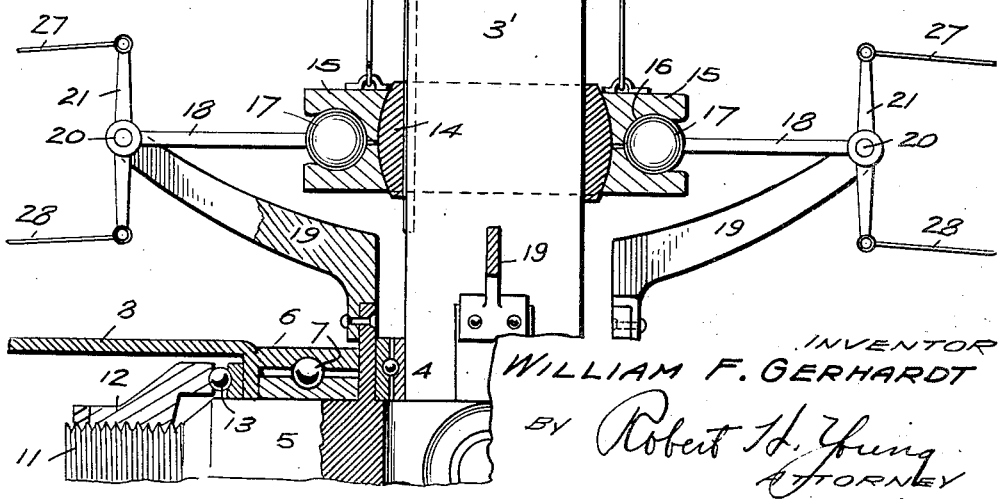

Patented July 11, 1933

1,917,965

UNITED STATES PATENT OFFICE

WILLIAM F. GERHARDT, OF GROSSE ILE, MICHIGAN

HELICOPTER CONTROL AND STABILIZER

Application filed September 4, 1930. Serial No. 479,771.

This invention relates to aerodynamics, but more particularly to the class of heavier-than-air machines known as helicopters, and the invention has for its object to provide means for controlling and stabilizing the same.

With this object in view, the invention consists of the novel construction of the helicopter screw and in the novel means for controlling and stabilizing the pitch and the angle of tilt of the same.

The invention further consists of certain other novel details of construction and combination of parts, all of which will be first fully described and afterwards specifically pointed out in the appended claims.

Referring to the accompanying drawings:

Figure 1 is a plan view of a helicopter screw constructed in accordance with this invention.

Figure 2 is a side elevation partly in section of the same illustrating the blades having the same pitch.

Figure 3 is a side elevation of the screw illustrating the blades having different pitches.

Figure 4 is a side elevation of screw showing means for controlling the side slipping action.

Figure 5 is an enlarged section of the controlling mechanism.

Like numerals of reference indicate the same parts throughout the several figures, in which 1 and 2 indicate the blades of the helicopter screw, and 3 is the vertical shaft therefor; 4 indicates the hub of the screw.

This hub is mounted on the shaft 3 by means of the ball-bearings 49. The nacelle, holding the pilot's cockpit and controls, is mounted rigidly on shaft 3 either above or below the plane of the helicopter screw.

Extending from the hub 4 are the trunnions 5 to receive the blades 1 and 2. The trunnions 5 are rotatively mounted on the shaft 3 by means of ball bearings 49 interposed between the shaft 3 and the hub 4 of the trunnions 5. Each blade is provided with a sleeve 6 enclosing a ball bearing 7 on the trunnion 5, said sleeve being projected from the tubular member 8 to which the effective blade element 9 is threaded at 10.

The threaded end 11 of the trunnion 5 extends into the tubular member 8 and receives a nut 12 acting against a ball thrust bearing 13. By means of the construction each of the blades 1 and 2 are rotatably mounted on the trunnions 5 and held against centrifugal force. It will thus be seen that the blades 1 and 2 are bodily rotatable around the vertical shaft 3 and are also rotatable on their longitudinal axes in such manner that their pitch or angle of incidence may be controlled as will now be described.

Slidable on the vertical shaft 3 is a sleeve 14 having its face formed on a radius which is equal to the radius of a sphere whose diameter is equal to that of the sleeve. The sleeve 14 is therefore a spherical segment and the outer surface thereof, may be termed a ball or cam face.

Suitably mounted on said sleeve is a universally movable circumferentially grooved ring 15, its inner surface having a curvature complemental to that of the ball face of the sleeve 14, the groove in the said ring being indicated by the numeral 16 and has its edges approaching each other suitably formed so as to loosely receive and retain the balls 17 of the T-shaped levers 18, and permit their unrestricted movement in the said groove 16.

Mounted on the hub 4 are the brackets 19 to which the T-shaped levers 18 are pivoted at 20, in such manner that depression or elevation of the balls 17 of the T-shaped levers 18 will swing said levers on the pivots 20 and move the arms 21 of said levers angularly to the vertical axis of the shaft 3.

The rotation of the blades in the example shown in the drawing is counter-clockwise. Extending behind the trailing edge of the blades are two brackets 22, to which are pivoted at 23, the tail planes or airfoil controls 24 having centrally thereof the upper and lower masts 25 and 26, to which cables 27 and 28 are connected, which cables lead to the arms 21 of the T-shaped levers 18.

At the upper end of the shaft 3 is the control stick 29 mounted on a universal joint 30, which joint is supported on a telescoping tube 31. For raising and lowering said telescoping tube 31, is a control lever 32 pivoted at 33 to an upstanding bracket 34 above the shaft 3.

Fixed to the control stick 29 at its lower end are the diametrically opposed lever arms 35 and 36, which, by means of the links 37 and 38, are connected to the ball-carrying ring 15 at diametrically opposite points.

Having thus described the invention, its operation is as follows:

The air screw thus described is stable about any condition of forward and upward speed for any setting of the control stick 29 and control lever 32. The blade and control plane is similar to an airplane system of wing and tail, consequently for any angle between the two surfaces, the main surface will be stable about a given angle of attack. The position of the control lever 32 determines mean angle of attack of the entire blade screw by simultaneously operating each of said blades to the same extent in the same sense.

Since for any given throttle opening the upward thrust depends only on the angle of attack, it will be seen that the upward speed may be thus determined solely by the lever setting. The control planes being angularly disposed to preserve a negative dihedral relation to the main blades, any side slipping will cause an increase in the effective angle of attack of the tail surface on the advancing blade, and a decrease on the tail surface of the opposite blade. The advancing blade will experience an increase of pitch and angle of attack and the opposite blade a decrease of pitch and angle of attack, which will alter the distribution of thrust over the disk area in such a way as to produce a restoring moment and the screw will tilt back to normal position.

In case it is desired to have the screw stable about a side slipping speed, as would be encountered in horizontal travel, it is only required that there be a previous difference of setting of the control planes sufficient to eliminate the restoring moment which would normally be set up by the action of control planes due to its dihedral.

The control or alteration of the speed is accomplished by the lever 32 and stick 29.

To increase the vertical speed, we have only to pull the lever 32, thus sliding the cam and sleeve 14 upward on the shaft. This raises the ball levers at all points around the circumference, the angle of attack of all control planes is decreased algebraically; thus lowering the control planes and rotating the main blades to an increased angle of attack. Hence the pitch and upward speed are increased. Vice versa the upward speed can be decreased by lowering the cam and sleeve 14 on the shaft.

To produce a side slipping speed in any direction, it is only necessary to tilt the stick to the direction desired. The cam is thus tilted on the sleeve 14 so as to depress the ball lever of any blade when it is on the side slipping side of the disk area and to elevate it when it is on the opposite side. As a result, the angle of attack of the control plane is decreased when on the side slipping side and increased on the opposite side producing a decrease of pitch of the main blade on the side slipping side and an increase when on the opposite side. This produces an uneven distribution of thrust and tilts the screw to side slip.

It is to be understood that the principle involved in this disclosure may be applied to any airfoil, and broadly contemplates means for maintaining a sequence of changes in pitch during each revolution of the rotating surface.

I claim:

1. In combination a blade screw comprising a blade revolvable about the vertical axis of said screw and movable to permit of a change of pitch, and means for effecting a sequence of changes in the pitch of said blade during each revolution of said screw, said means, including auxiliary airfoil carried by said blade and angularly disposed thereto, being presented endwise in the direction of movement of said blade.

2. In combination a blade screw comprising a plurality of lifting blades, and means for differentially changing the pitch of the blades to afford varying pitch of each of said blades during each rotation of said air screw, said means, including auxiliary airfoil carried by said blade and angularly disposed thereto, being presented endwise in the direction of movement of said blade.

3. In combination a blade screw comprising a hub, a plurality of lifting blades connected to said hub to permit of a change of pitch, means cooperating with said blades to permit a sequence of changes of pitch during each rotation of the blades, means for controlling the position of said first mentioned means, and an airfoil control member carried by each blade, said airfoil members beings inclined relative to their respective blades and to each other for laterally stabilizing said screw in a side slip.

4. In combination a blade screw comprising a plurality of lifting blades supported by said hub and in movable relation thereto to permit of a change of pitch, said blades being disposed substantially symmetrically and in the same plane, airfoil control members pivotally connected to said blades and inclined relative thereto for aerodynamically controlling the pitch of said blades, and means for differentially operating said control members.

5. In a helicopter, an air screw comprising main blades adapted to swivel upon their longitudinal axes to permit of a change of pitch, control planes pivoted upon the main blades and inclined relative thereto, and means for simultaneously operating the control planes with respect to each other to alter their angle of attack upon the airstream and thereby correspondingly swivel the main blades to change their pitch.

6. In a helicopter, an air screw comprising main blades adapted to swivel upon their longitudinal axes to permit of a change of pitch, control planes pivotally connected to the main blades, each plane being disposed at a negative dihedral angle with respect to its corresponding blade whereby the effective angle of attack on the airstream is increased on one plane and diminished on the opposite plane during a side slip, and means for simultaneously tilting the control planes to alter their angle of attack upon the airstream and thereby swivel the main blades to change their pitch correspondingly.

7. In a helicopter, an air screw comprising main blades swivelly mounted to permit of a change of pitch, control planes in aerodynamic relation with said main planes, each control plane being spaced rearwardly from the trailing edge of its respective main blade and disposed at a negative dihedral angle with respect thereto, and means for tilting the control planes oppositely with respect to each other to correspondingly swivel the main blades and change their pitch.

8. In combination, a blade screw comprising a hub, a plurality of lifting blades connected to said hub to permit of a change of pitch, means cooperating with said blades to permit a sequence of changes of pitch during each rotation of the blades, means for controlling the position of said first mentioned means, and means carried by and cooperating with each blade for laterally stabilizing said screw in a side slip.

9. In combination, a blade screw comprising a hub, a plurality of lifting blades connected to said hub to permit of a change of pitch, means cooperating with said blades to permit a sequence of changes of pitch during each rotation of the blades, means for controlling the position of said first mentioned means, and an air vane means aerodynamically cooperating with each blade for laterally stabilizing said screw in a side slip.

In testimony whereof I affix my signature.

WILLIAM F. GERHARDT.